United States Patent [19]

Lau et al.

[11] Patent Number: 4,780,367

[45] Date of Patent: Oct. 25, 1988

[54] TACKIFIED STAR BLOCK COPOLYMER PRESSURE-SENSITIVE ADHESIVE COMPOSITION AND THE SHEET MATERIALS COATED THEREWITH

[75] Inventors: Felix P. Lau, Woodbury; Spencer F. Silver, White Bear Lake, both of Minn.

[73] Assignee: Minnesota Mining and Manufacturing Company, St. Paul, Minn.

[21] Appl. No.: 690,383

[22] Filed: Jan. 10, 1985

Related U.S. Application Data

[63] Continuation-in-part of Ser. No. 507,684, Jun. 27, 1983, abandoned.

[51] Int. Cl.$^4$ .................... C09J 7/02; C08L 53/02
[52] U.S. Cl. .................... 428/355; 428/906; 524/274; 525/98; 525/250; 525/271; 525/314
[58] Field of Search ............... 525/98, 314, 250, 271; 524/274; 428/462, 495, 512, 521, 355, 906

[56] References Cited

U.S. PATENT DOCUMENTS

| | | | |
|---|---|---|---|
| 3,239,478 | 3/1966 | Harlan, Jr. | 260/27 |
| 3,519,585 | 7/1970 | Miller | 260/27 |
| 3,658,740 | 4/1972 | Marrs | 260/27 |
| 3,949,020 | 4/1976 | Prudence | 260/879 |
| 3,985,830 | 10/1976 | Fetters | 260/880 |
| 4,133,731 | 1/1979 | Hansen et al. | 204/159.17 |
| 4,136,137 | 1/1979 | Hsieh et al. | 260/880 |
| 4,148,771 | 4/1979 | Nash | 260/27 |
| 4,288,567 | 9/1981 | Feeney et al. | 525/99 |
| 4,444,953 | 4/1984 | St. Clair | 525/98 |

Primary Examiner—Wilbert J. Briggs, Sr.
Attorney, Agent, or Firm—Donald M. Sell; James A. Smith; Richard Francis

[57] ABSTRACT

Adhesive compositions comprising tackified star block copolymer having at least 12 block copolymer arms are provided. Sheet materials coated with the adhesive composition are also provided.

18 Claims, 2 Drawing Sheets

TACKIFIED STAR BLOCK COPOLYMER PRESSURE-SENSITIVE ADHESIVE COMPOSITION AND THE SHEET MATERIALS COATED THEREWITH

CROSS REFERENCE TO RELATED APPLICATION

This is a continuation-in-part application of Ser. No. 507,684, filed June 27, 1983, now abandoned.

TECHNICAL FIELD

This invention relates to normally tacky pressure-sensitive adhesive compositions comprising tackified star block copolymer and sheet materials coated therewith.

BACKGROUND ART

Normally tacky pressure-sensitive adhesive (hereinafter referred to by the abbreviation "PSA") compositions suitable, for example, for use in adhesive tapes must have an art-recognized[1] four-fold balance of adhesion, cohesion, stretchiness and elasticity. PSA coated tapes have been produced and sold for at least a half century.

[1] 1952 Fall Symposium, Division of Paint, Varnish and Plastics Chemistry, American Chemical Society.

The early PSA tapes relied upon natural rubber for the elastomeric base and wood rosins as tackifiers to provide adhesive compositions with the requisite four-fold balance of properties. While tackified natural rubber provided a PSA composition which was of commercial significance, improvements in such compositions were sought because of the expanded expectation level of performance of PSA compositions. Various improved PSA compositions were thus developed.

Ionic polymerization produced block copolymer elastomers such as linear AB and ABA block copolymers which were likely candidates for the elastomer base in the PSA compositions and many were incorporated into such compositions to produce adhesives having high performance characteristics. For example, Harlan (U.S. Pat. No. 3,239,478) produced PSA compositions based on ABA block copolymer, tackifier resin and extender oil, recognizing that improved tack and cohesive strength could be obtained despite a heavy loading of extender oil. Miller (U.S. Pat. No. 3,519,585) produced an improved PSA composition having high peel strength, creep resistance and tack by blending AB and ABA block copolymers with a tackifier resin.

Other elastomer candidates for preparing PSA compositions include so-called branched block copolymers, radial teleblock copolymers and multiarm star block copolymers. The various polymer structures described by the term "branched", "radial" and "star" are not the same. "Branched" is a generic term indicating a nonlinear structure which may contain various polymeric subunits appended to various places on a main polymer chain or backbone. Such structures are typically complex in nature and may be derived by free radical, cationic or anionic polymerization. The term "radial" generally refers to branched polymer structures obtained by linking individual polymeric segments to yield a mixture of polymers having four or fewer arms joined centrally. The term "star" describes the structure of a multiarm polymer with copolymer arms which are joined together at a nucleus formed of a linking group which is virtually a point relative to the overall size of the remainder of the polymer structure. Non-terminating coupling agents, those in which the polymerizing anionic structure is retained, are generally preferred as linking agents for "star" structures.

While several references disclose preparing adhesive compositions or PSA compositions employing branched block copolymers, radial teleblock copolymers and multiarm star block copolymers, none recognize that a unique combination of superior shear holding power and desirable melt viscosity may be obtained by selecting only star block copolymers having an average of 12 or more arms to prepare a tackified adhesive composition. For example, Fetters et al (U.S. Pat. No. 3,985,830) recognize that adhesives may be prepared from star polymers but fail to specify details of the composition of the same or that the same is a PSA. St. Clair (U.S. Pat. No. 4,444,953) describes asymmetric star block polymer having at least 6 arms prepared by terminally linking together a mixture of styrene-isoprene AB block polymers and isoprene homopolymers. St Clair's disclosure compares the physical properties of a conventional star copolymer having an average of 8.6 arms with the asymmetric star polymers and of adhesives made therewith. Such comparison shows these polymers possess a relatively lower tensile strength and, when formulated as an adhesive, a relatively high melt viscosity, which may indicate to one skilled in the adhesive art that adhesive compositions containing such star polymers may not have superior shear strength properties and may not be easily melt processable. Hsieh et al. (U.S. Pat. No. 4,136,137) discloses the preparation of adhesive compositions including so-called branched radial polymers which have between three or four branches or arms. Marrs et al. (U.S. Pat. No. 3,658,740) discloses the preparation of PSA compositions by combining branched block copolymers which may have as few as 3 branches with linear block copolYmers, tackifiers and organic solvents. Marrs designed a PSA formulation which requires a tackified blend of linear and multiarm block copolymers employing a solvent as a critical element in the resultant adhesive formulation which was designed to bond to a wide variety of substrates but fails to address the need for hot melt processability. Nash (U.S. Pat. No. 4,148,771) discloses the preparation of PSA compositions employing rubbery coupled conjugated diene/monovinyl-substituted aromatic hydrocarbon teleblock copolymers. Nash attacks the problem of improved holding power for PSA by incrementally charging the styrene and initiator prior to addition of the butadiene in the preparation of copolymer to produce a PSA composition. While the resulting PSA may have improved holding power, it would not have a lower melt viscosity or ease of processing. Feeney (U.S. Pat. No. 4,288,567) employs a branched block copolymer described in Prudence (U.S. Pat. No. 3,949,020) then relies upon a solution preparation process to achieve an adhesive composition having increased tack, faster molten solution time and improved tack retention in hot melt blends. Feeney requires a compatible tackifying resin be combined with the block copolymer in its polymerizate form but fails to consider the need for ease of processing a hot melt of his adhesive composition. Hansen (U.S. Pat. No. 4,133,731) modifies star block copolymer PSA by using electron beam or ultraviolet radiation in combination with a supplemental crosslink-promoting tetrafunctional acrylate to improve holding power but not ease of processing of his adhesive composition.

The aforementioned prior art fails to recognize that the shear strength of the PSA may be optimized without sacrificing the ease of processing. Applicants' adhesive composition provides an adhesive composition with improved shear strength and good processability which can be used in packaging tape applications where shear holding power is necessary.

DISCLOSURE OF INVENTION

The present invention provides a normally tacky and PSA compositon and adhesive coated sheet materials having the requisite four-fold balance of adhesion, cohesion, stretchiness and elasticity. The adhesive composition also has good peel strength and adhesive tack plus superior shear strength and creep resistance as well as excellent processability with or without solvent.

In accordance with the invention, a normally tacky and PSA composition having a melt Brookfield viscosity in the range of about 25–100 Pa.s comprises:

(1) star block copolymer having the general formula (A-B$_n$C wherein:

"(A-B" represents one of an average of "n" polymeric arms radiating from a nucleus represented by "C";

"A" represents a terminal polymeric block consisting essentially of polymerized monovinyl aromatic monomer having 8 to 18 carbon atoms and being selected from a group consisting of styrene and alkylated styrene;

"B" represents a polymeric block consisting essentially of polymerized conjugated diene monomer having 4 to 12 carbon atoms;

"C" represents the residue of a polyvinyl aromatic compound providing a nucleus which links together at least twelve polymeric arms of the star block copolymer; and "n" is an integer of at least 12; and wherein:

"A" comprises about 5–25 weight percent of the total weight of A plus B in said polymer;

"B" comprises about 75 to 95 weight percent of the total weight of A plus B in said polymer; and "C" comprises no more than about 3 weight percent of the total weight of said star block copolymer; and (2) sufficient adhesive tackifier resin to maintain an adhesive composition with balance of PSA properties wherein the shear holding power is at least 1,000 minutes.

The monovinyl aromatic monomer preferably is selected from the group consisting of styrene, methyl styrene (e.g., alpha-methyl styrene or ring substituted methyl styrene) and butyl styrene, with styrene being preferred.

The preferred conjugated diene has from 4 to about 10 carbon atoms. Useful conjugated dienes include butadiene, isoprene, piperylene, myrcene, 2,3-dimethyl butadiene and mixtures of two or more of these. The most preferred conjugated diene is isoprene.

The average number of polymeric arms "n" is measured by size exclusion chromatography with low-angle laser light-scattering detection (SEC/LALLS). Light scattering (using forward scattering and laser sources) by colloidal-sized particles is related to the molecular weight of the particle. If the weight per unit volume of the particles and the relative refractive index (dn/dc) are known, then the molecular weight can be calculated. Therefore, in SEC/LALLS, the particles are separated in a column and subjected to laser light, the scattering of which yields the molecular weight of the star polymer directly. If the molecular weight of an "arm" is known (the arm is obtained by directly sampling the polymerization mixture before the divinylbenzene linking reagent is added), and the molecular weight of the linked-arm star is known, then it is a simple matter to calculate the number of arms per star molecule.

The SEC/LALLS system is described by R. C. Jordan et al. in "Size Exclusion Chromatography with Low-Angle Laser Light-Scattering Detection", ACS Symposium Series, No. 245, 1984.

The SEC/LALLS system contains a Model 110A pump (Altex), Model 7125 injector (Rheodyne), KMX-6 Low-Angle Laser Light Scattering Photometer (LDC/Milton Roy), and a Model 98.00 Refrative Index Detector (Knauer). The KMX-6 scattering intensity was measured with the 6–7 degree forward-scattering annulus. A series of Zorbax PSM columns (DuPont) ws used: PSM 60, PSM 1000, PSM 1000, PSM 60, PSM 1000. Tetrahydrofuran (THF) from Baker was filtered through a 0.22 micrometer Fluoropore filter (Millipore Corp.) before use in chromatography, and a flow rate of 0.7 ml/min was used.

Analog detector data were acquired via analog/digital Instrument Interface Modules (LDC/Milton Roy) connected in series to a Minc 11/23 (digital Equipment Corp.) computer. Software packages for run-scheduling and data acquisition ("RTDAS-I"), conventional calibration SEC ("GPC-II"), and SEC/LALLS data processing ("MOLWT-II") were from LDC/Milton Roy.

Multiarm polymer samples were prepared via anionic polymerization in cyclohexane at 50°–60° C. Polystyrenyl lithium anions of desired molecular weight were prepared with S-butyl lithium initiation, followed by addition either of isoprene or butadiene to give block polydienyl anion. A sampling of the latter was taken, terminated, and used as a representative linear block arm. The muliarm samples were synthesized by addition of divinylbenzene (DVB) at a mole ratio of 4.5 DVB:1 anion. The polymerization was terminated by methanol addition. Four styrene/isoprene linear block samples (SI-X) of different molecular weight and composition were prepared along with the corresponding multiarm samples: ((SI-X) DVB); one styrene/butadiene (SB-1) and its multiarm ((SB-1) DVB) was made. Proton nuclear magnetic resonance analysis (NMR) gave the following weight percent styrene for each linear block: SI-1 (9%), SI-2 (23%), SI-3 (26%), SI-4 (48%), and SB-1 (53%).

Stock solutions of polymer samples were prepared with known concentration (w/v) in the solvent of choice in the range of $4\times10^{-3}$ to $5\times10^{-3}$ gm/ml. These stock solutions were filtered through a 0.22 micrometer Fluoropore filter prior to injection, and an injection size of 50 microliters was used. The specific refractive index increment (dn/dc) was measured at 26° C. with a KMX-16 Laser Differential Refractometer (LDC/Milton Roy).

Off-line (static) values of the weight-average molecular weight ($M_w$) were measured using solutions prepared with toluene, tetrahydrofuran (THF), and chloroform. Four or five solutions in the range $1.0\times10^{-3}$ to $0.5\times10^{-3}$ gm/ml for the linear block and $0.1\times10^{-3}$ to $5.0\times10^{-3}$ gm/ml for multiarm samples were prepared via serial dilution of a stock solution which was prefiltered through a 0.22 micrometer Fluoropore filter. Also, a similar 0.22 micron filter was placed in the sample inlet line to the KMX-6 LALLS cell. The LALLS measurements were performed at 6-7 degrees forward scattering angle, and data were processed and plotted in the standard fashion as Kc/R vs. c; where Kc is an optical constant, R is the "excess" Rayleigh factor calculated from the excess scattering of polymer solution over solvent, and c is the polymer concentration. The intercept and slope of the best (visual) linear fit to the data gave the weight-average molecular weight ($M_w$) and second virial coefficient ($A_2$), respectively.

Preferably, the adhesive tackifier resin is selected from a group consisting of polyterpene resin, polyvinyl aromatic resin, coumarone-indene and mixed $C_5$ aliphatic and $C_9$ aromatic hydrocarbon resins. The mixed $C_5/C_9$ resin is most preferred.

A normally tacky and pressure-sensitive coated sheet material in accordance with the present invention comprises a backing member and a coating covering at least a portion of one major surface thereof of the above-defined PSA composition.

BRIEF DESCRIPTION OF DRAWING

In order to better understand the benefit derived from the teaching of this invention, a comparison has been made of the melt viscosity as a function of the shear rate of adhesive compositions including the star block copolymer according to the invention with typical prior art adhesive compositions which utilize either linear ABA-type block copolymers or radial teleblock copolymers having less than 6 arms. This comparison is shown in FIGS. 1-4 of the drawing. This comparison was accomplished by measuring the viscosity of comparably tackified examples of commercially available block copolymers and adhesive compositions containing star block copolymers according to the invention.

BEST MODE FOR CARRYING OUT THE INVENTION

Methods of preparing star block copolymers are known as illustrated by Fetters et al. (No. 3,985,830) and Bi et al. (No. 4,180,530). Star block copolymers useful in the present invention must be of the particular type defined above in order to obtain the required adhesive properties in the claimed PSA compositions, particularly the very high shear values and desirable processability.

Such polymers have been prepared by polymerization of monomer to produce the A polymeric block, with an organolithium compound followed by the addition of another monomer to produce the B polymeric block to form an AB block copolymer terminated with a lithium ion. Subsequently, a linking agent with a functionality of at least two is added to the lithium terminated B blocks to form the star structure which consists of copolymeric arms connected via the linking agent, the linking agent being in such a small proportion to the total weight percent of the resulting copolymer that its presence is relatively inconsequential as compared to the properties of the polymeric constituents.

The A block preferably has a glass transition temperature ($T_g$) of at least about 20° C. above room temperature.

The B block preferably has a $T_g$ at least 20° C. below room temperature.

The star block copolymer must have an average of at least 12 polymeric (A-B) arms. Preferably, the average number of polymeric arms varies from 12 to about 30.

The molecular weight of each polymeric arm may vary from 40,000 to 200,000. Molecular weight of the individual blocks of the polymeric arms may be varied to provide optimum properties. The molecular weight of the monoalkenylaromatic blocks may be 5,000 to about 50,000 preferably 8,000 to 20,000. The molecular weight of the conjugated diene blocks may be 20,000 to about 200,000 preferably 50,000 to 100,000. The ratio of monoalkenylaromatic and conjugated diene preferably is chosen so that a glassy or hard phase resulting from the monoalkenylaromatic blocks constitutes between 6% and 20% of the total polymer present, preferably in the range 10% to about 18% with the remainder being a rubbery phase resulting from the conjugated diene blocks. The number of arms of the star block copolymer may be controlled by selection of the linking agent. With control of these variables, a molecular weight required to produce the desired shear value end product may be reached.

The initiators useful in the preparation of the star block copolymer are known alkyllithium compounds such as methyllithium, n-butyllithium and sec-butyllithium, cycloalkyllithium compounds such as cyclohexyllithium and aryllithium compounds such as phenyllithium, naphthyllithium and the like.

The quantity of linking agent used is derived from the actual content (moles/liter basis) of active polymer chain ends in the polymerization mixture. Generally, a mole equivalent ratio of linking agent to active chain ends of 3:1 to about 20:1 or higher may be used. The preferred ratios are 4:1 to about 6:1. In the case of difunctional agents which polymerize during the coupling reaction, such as divinylbenzene, the amount of agent to be used should be determined for the conditions of reaction, since the number of equivalent functional sites is variable.

The compactness of the star block configuration, in contrast to its linear or radial analogs, contributes substantially to the ease of processing the PSA composition.

The tackifier resin is selected to provide the star block copolymer with an adequate degree of tack to maintain in the resultant composition balanced PSA properties including a high shear strength value. As is known in the art, not all tackifier resins interact with the same base elastomer in the same manner; therefore some minor amount of experimentation may be required to select the appropriate tackifier resin and to achieve optimum adhesive performance. Such minor experimentation is well within the capability of one skilled in the adhesive art. Along these lines, selection of the resin should take into account whether the resin associates with the thermoplastic styrene segments or the rubbery segments.

A preferred diolefin/olefin copolymer resin is a mixture of piperylene and at least one olefin containing 4 to 6 carbon atoms at a mole ratio in the range of 0.8 to 1.0 to about 2.5 to 1.0. Optionally, the copolymer may be modified by copolymerizing therewith about 5 to about 20 weight percent based on the total monomers of at least one additional monomer selected from methyl styrene and dicyclopentadiene. These resins typically have a softening point in the range of 50° C. to 150° C.

The PSA compositions of this invention may be formed by mixing star block copolymer and tackifying resin, either in solution, as dry granules or melt blending. The application of the PSA composition by conventional hot melt extrusion equipment is easily facilitated because of the relatively low melt viscosity of this high shear strength adhesive. The PSA composition may be applied to any conventional backing member such as paper, foil, film, woven or nonwoven backing material such as that used for packaging and fastening tapes.

EXAMPLES

The invention is illustrated by the following examples, wherein all parts are by weight unless otherwise indicated.

The Description of Preparation of Star Block Copolymers S-1 to S-9

A polymerization reactor was charged with dry cyclohexane and dry styrene monomer. Sec-butyl lithium was added and the styrene block allowed to polymerize for one hour at 60°–65° C. Dry isoprene was then added and the second block allowed to polymerize for a minimum of 2 hours at 50°–65° C. The block polymer "arms" so produced were then linked in a star structure by the addition of dry divinylbenzene (Matheson Coleman & Bell, 56%) at 65°–70° C. and maintained at this temperature overnight (about 14 hours). After cooling to room temperature, 1–2% (based on solids) octadecyl-3,5-di-tert-butyl-4-hydroxyhydrocinnamate (Ciba Giegy "Irganox" 1076) antioxidant and thermal stabilizer was added as a polymer stabilizer. The amount and type of each ingredient used in the reaction together with the composition of the resultant polymer are shown in Table I. It will be recognized by those skilled in the art that these polymerizations were conducted with meticulus attention to maintaining anhydrous and anaerobic conditions.

Additionally, Table I shows the average number of copolymer arms per star for each star polymer composition. The number of arms linked together is an average for a "distribution" of polymer molecules and is cntrolled by the chemistry of the linking reaction between the linking reagent, divinylbenzene (DVB), and the copolymer lithium end groups. As shown by Fetters et al., U.S. Pat. No. 3,985,830, at least two DVB molecules must add to the end of the copolymer chain in order for linking to occur. Therefore, there is always at least one vinyl group left over for further reaction. In order to link a high percentage of the lithium terminated copolymer arms a threshold amount of DVB, of about two moles of DVB per mole of arms, is required. However, since the linking reaction is nonterminating small amounts of DVB in excess of the threshold (e.g., 3 moles DVB/mole arms) can link together large numbers of arms. At mole ratios of DVB greater than the threshold the stars will have, on the average, more than 12 arms per star, with the number of arms linked being a factor of steric inhibition and charge density at the forming star nucleus.

In the preparation of the star polymer samples listed in Table I the mole ratio of DVB to copolymer arms ranged from 3.3 to 7.1. Since the amount of DVB used was greater than the threshold, of about two moles of DVB per mole of arms, the average number of arms linked together per star was greater than 12.

The discovery that using molar ratios of DVB to arms greater than the threshold amount produces star polymers with greater than 12 arms per star, on the average, is verified by the observations of Jordan et al. Jordan et al. evaluated four polystyrene-polyisoprene star block copolymers prepared according to the procedure described in the examples of this application, using 4.5 moles of DVB per mole of copolymer arms, and found the average number of arms per star to be greater than 15 for all four copolymers.

TABLE I

| Polymer Number | REACTANTS - PARTS | | | | | | POLYMER CHARACTERIZATION | | |
|---|---|---|---|---|---|---|---|---|---|
| | cyclo-hexane | sec-butyl lithium | styrene | isoprene | divinyl-benzene | $C_2H_4Br_2$ | styrene-isoprene[1] (MW × $10^{-3}$) | star[1] (MW × $10^{-3}$) | number arms[2] per star |
| S-1 | 2,276 | 0.41 | 52 | 377 | 3.48 | — | 8–60 | 526 | 15 |
| S-2 | 11,400 | 1.56 | 210 | 1,060 | 10.1 | — | 8–40 | 386 | 15 |
| S-3 | 2,300 | 0.38 | 60.5 | 365.5 | 3.53 | — | 10–60 | 699 | 15 |
| S-4 | 2,381 | 0.32 | 60.5 | 310.8 | 4.76 | — | 12–60 | 648 | 15 |
| S-5 | 1,545 | 0.11 | 28.6 | 102 | 1.03 | — | 17–60 | 430 | 15 |
| S-6 | 2,328 | 0.64 | 59.7 | 363.3 | 8.35 | — | 6–36 | 330 | 15 |
| S-7 | 2,194 | 1.08 | 49.3 | 300 | 2.2 | — | 12–74 | 874 | 15 |
| S-8 | 11,400 | 9.0 | 210 | 1,060 | 10.1 | — | 15–76 | 774 | 15 |
| S-9[3] | 1,506 | 0.24 | 32.1 | 225 | — | 0.7 | 8–60 | 192 | 2 |

[1]Molecular weight determined by size exclusion gel permeation chromatography.
[2]Estimated because of similarity in method of preparation on samples evaluated by the method described by R. C. Jordan et al, Size Exclusion Chromatography with Low-Angle Laser Light-Scattering Detection, ACS Symposium Series, No. 245 Size Exclusion Chromatography, 1984.
[3]S-9 is not a star block copolymer. It is a 2-arm linear block analog of S-2.

EXAMPLE 1

Star block copolymer S-8 was compounded into PSA compositions by mixing in solution with a synthetic hydrocarbon tackifier resin available under the registered trademark "Wingtack Plus" from the Goodyear Tire and Rubber Company. Shear adhesion was determined by ASTM-D3654 25.4×25.4 mm overlap shear to fiberboard at 49° C. The shear adhesion values of the various PSA compositions identified in Table II were compared to that of control PSA compositions made with a four arm radial block polymer available under the registered trademark "Solprene" 423 (Phillips Chemical Co.) and a linear triblock polymer available under the registered trademark "Kraton" 1107 (Shell Chemical Company). Results are shown in Table II.

TABLE II

| Tackifier resin phr | SHEAR ADHESION MINUTES | | |
|---|---|---|---|
| | ABA linear copolymer | Radial (AB) block copolymer | Star polymer S-8 |
| 80 | 2840[1] | 1500[1] | 2840[1] |
| | 2840[1] | 1500[1] | 2840[1] |
| 100 | 1344 | 1000[1] | 2840[1] |
| | 947[1] | 1000[1] | 2840[1] |
| 120 | 1245 | 1399 | 2840[1] |
| | 1199[1] | 1220[1] | 2840 |
| 140 | 891 | 560 | 2840[1] |
| | 880 | 343 | 2840[1] |
| 160 | 10 | 226 | 2359 |
| | 10 | 75 | 1318 |
| 180 | 3 | 3 | 12 |
| | 6 | 10 | 17 |
| 200 | 2 | 0.3 | 1 |
| | 1 | 0.3 | 1 |

[1]Test was terminated before failure occurred.

EXAMPLE 2

Adhesive compositions according to the invention were prepared by solution blending star block copolymer star polymer Nos. S-2, S-8 or ABA linear block copolymer (available under the registered trademark "Kraton" 1107) with polyterpene tackifier resin available under the registered trademakr "Zonarez" M1115 (Arizona Chemical Co.) Shear adhesion values were determined by ASTM D3654 and results are shown in Table III.

TABLE III

| Tackifier phr | Shear Adhesion (Minutes) | | |
|---|---|---|---|
| | ABA Copolymer | S-2 | S-8 |
| 80 | 2580[1] | 2580[1] | 2640[1] |
| | 2580[1] | 2850[1] | 2640[1] |
| 100 | 2580[1] | 2282 | 2640[1] |
| | 2580[1] | 2032 | 2640[1] |
| 120 | 1791 | 393 | 2640[1] |
| | 787 | 662 | 2640[1] |
| 140 | 305 | 94 | 2640[1] |
| | 337 | 83 | 2640[1] |

[1]Test was terminated before failure occurred.

EXAMPLE 3

A series of star block copolymers (Nos. S-6, S-2, S-7 and S-8) with increasing molecular weights but relatively constant composition were compounded with tackifier resin (available under the registered trademark "Wingtack Plus" from the Goodyear Tire and Rubber Co.) to produce PSA compositions. The shear adhesion values of these compositions were determined by testing 12.7 mm by 19 mm overlap shear bonds to fiberboard at 49° C. (a modified ASTM-D3654 method). These formulations were compared to a PSA composition made with a commercial ABA linear block copolymer (available under the registered trademark "Kraton" 1107). Results are reported in Table IV.

TABLE IV

| Polymer Tackifier (phr) | Shear Adhesion (Minutes) | | | | |
|---|---|---|---|---|---|
| | ABA Copolymer | S-6 | S-2 | S-7 | S-8 |
| 100 | 3024[1] | 27 | 1349 | 3610[1] | 3820[1] |
| | 3024[1] | 25 | 1067 | 3713[1] | 1977[1] |
| 120 | 1750[1] | 16 | 1021 | 2014[1] | 3820[1] |
| | 1505[1] | 18 | 601 | 2013[1] | 3820[1] |
| 140 | 590 | 23 | 651 | 2981[1] | 3255[1] |
| | 701 | 14 | 760 | 3679[1] | 3814[1] |
| Composition: (styrene/isoprene)[2] | 11.5/70 | 6/36 | 8/40 | 12/74 | 15/76 |

[1]Test was terminated before failure occurred.
[2]As determined by SEC GPC

EXAMPLE 4

A series of polymers (Nos. S-1, S-3, S-4 and S-5) with relatively constant molecular weight but increasing styrene content were compounded with tackifier resin available under the registered trademark "Wingtack Plus" from Goodyear Tire and Rubber Co. to produce PSA compositions. The shear adhesion was determined as described in Example 2. Results are reported in Table V.

TABLE V

| Polymer Tackifier (phr) | Shear Adhesion (Minutes) | | | |
|---|---|---|---|---|
| | S-1 | S-3 | S-4 | S-5 |
| 100 | 252 | 2820[1] | 2820[1] | 3786[1] |
| | 362 | 2820[1] | 2485[1] | 2786[1] |
| 120 | 303 | 2820[1] | 2820[1] | 3786[1] |
| | 302 | 2820[1] | 2820[1] | 3786[1] |
| 140 | 167 | 2820[1] | 2820[1] | 3786[1] |
| | 278 | 5482[1] | 5482[1] | 3786[1] |
| % styrene | 11.8 | 14.3 | 16.7 | 22.4 |

[1]Test was terminated before failure occured.

EXAMPLE 5

The star block copolymer adhesives of the invention were also compared to their linear analogs formed by coupling only two arms together and the shear adhesion determined as in Example 2. Results are reported in Table VI.

TABLE VI

| Polymer Tackifier resin[1] (phr) | Shear Adhesion (minutes) | |
|---|---|---|
| | S-9[2] | S-2 |
| 100 | 28 | 2176 |
| | 30 | 2071 |
| 120 | 14 | 1624 |
| | 17 | 1805 |
| 140 | — | 739 |
| | — | 1123 |

[1]Available under the registered trademark "Escorez" 1310 (Exxon Chemical Co.).
[2]S-9 is not a star block copolymer. It is a linear two arm analog of star block copolymer S-2.

EXAMPLE 6

Hot-Melt Experiments

After a pre-weighed amount of hydrocarbon tackifier resin available under the registered trademark "Escorez" 1310 (Exxon Chemical Company) had been melted in a Helicone ® mixer (Atlantic Research Corporation), the polystyrene-polyisoprene block copolymer was added to the mixer. These two components were mixed for 10 to 15 minutes and the molten resultant adhesive was pumped through a die onto a 50 micron polyester film and the coated sheet was rolled into a jumbo roll. The jumbo roll was slit into 25.4 mm wide rolls of adhesive tapes. The hot-melt adhesive formulations, processing temperatures and coating weights of the experiment are reported in Table VII.

TABLE VII

| Polymer | Tackifier (phr) | Mixer Temp. (degrees C.) | Mixing Time (minutes) | Coating Weight (mg/200 cm$^2$) |
|---|---|---|---|---|
| linear triblock[1] | 100 | 177 | 14 | 670 |
| S-2 | 100 | 174 | 10 | 960 |
| S-2 | 120 | 174 | 8 | 820 |
| S-8 | 120 | 193 | 14 | 685 |
| S-8 | 140 | 180 | 15 | 645 |

[1]Available under the registered trademark "Kraton" 1107 (Shell Chemical Company).

Figure 1:
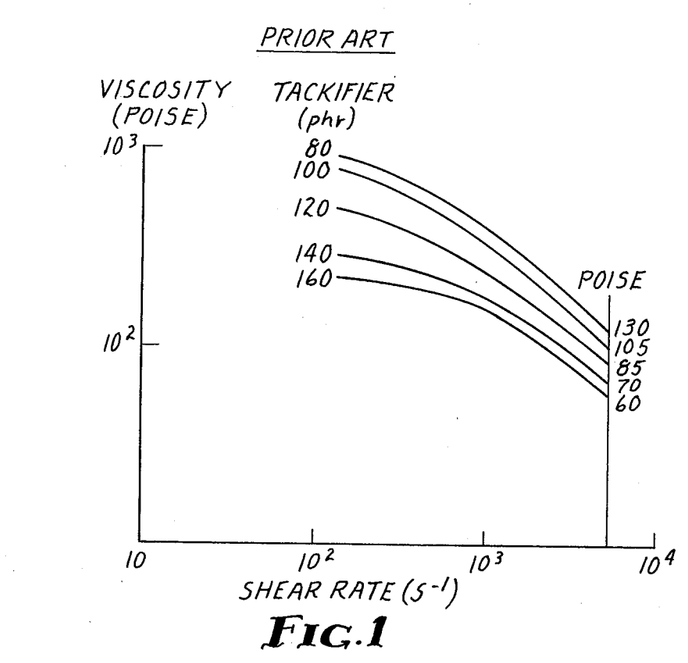
FIG. 1 is a plot resulting from the evaluation of a prior art PSA with varying amounts of tackifier, as shown, which utilizes a commercially available linear ABA-type block copolymer, consisting essentially of a styrene-isoprene-styrene with a molecular weight of about 160,000 (Shell's Kratone® 1107).
Figure 2:
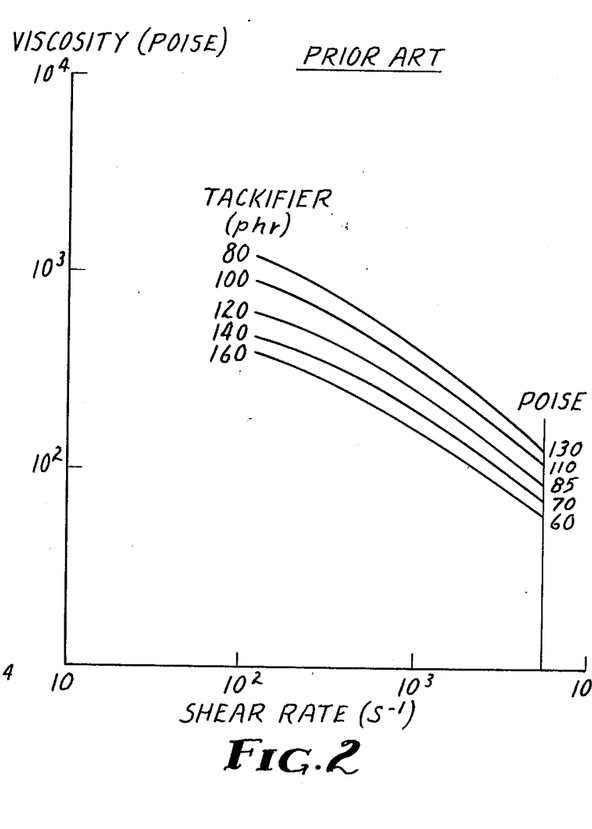
FIG. 2 is a plot resulting from the evaluation of a prior art PSA with varying amounts of tackifier, as shown, which utilizes a radial teleblock copolymer having less than 6 arms with a molecular weight of about 280,000 (Phillips' Solprene® S-423).
Figure 3:
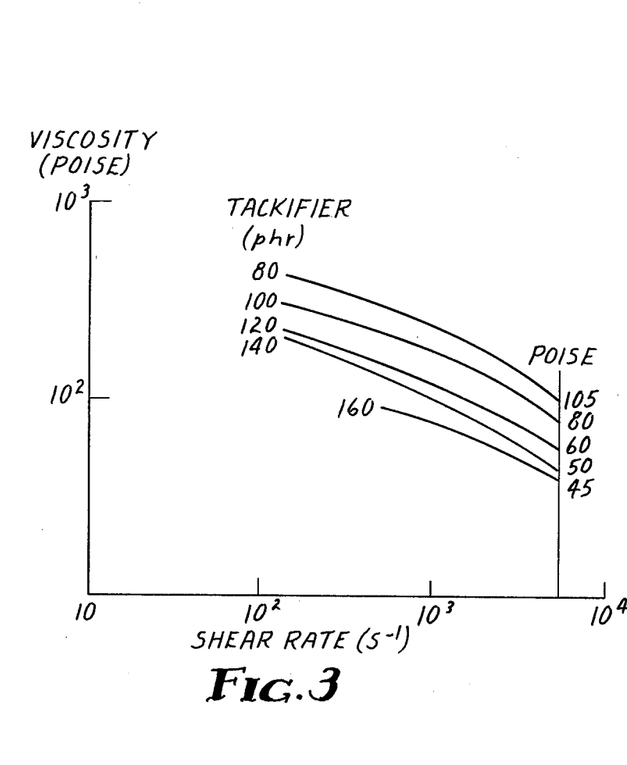
FIG. 3 is a plot resulting from the evaluation of an adhesive composition according to the present invention with varying amounts of tackifier, as shown, containing star block copolymer having a molecular weight of about 386,000 and estimated to have an average of 15 arms. (Examples S-2 of Table 1).
Figure 4:
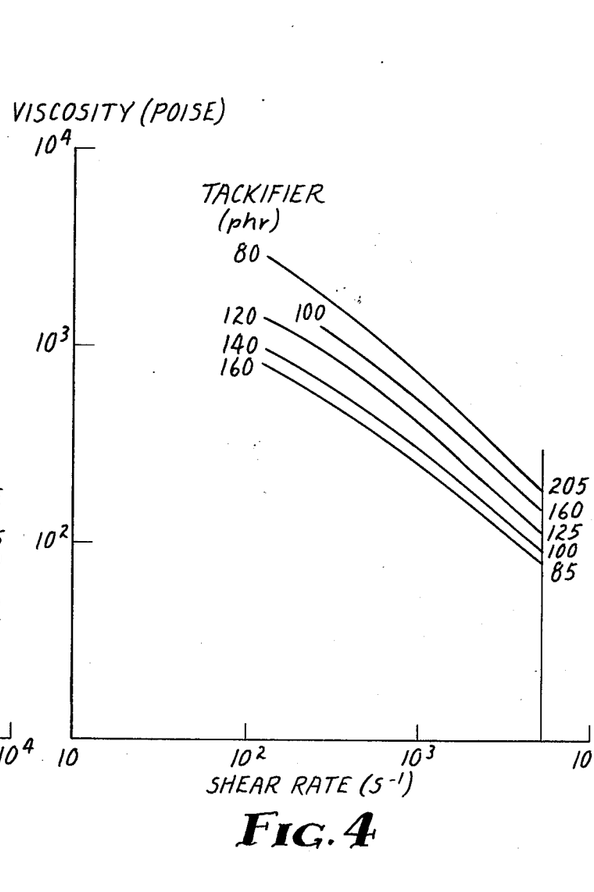
FIG. 4 is a plot resulting from the evaluation of an adhesive composition according to the present invention with varying amounts of tackifier, as shown, containing star block copolymer having a molecular weight of about 774,000 and estimated to have an average of 15 arms. (Example S-8 of Table I).

Explanation of Data in FIGS. 1-4

An Instron° Capillary Rheometer 3211 equipped with recording instruments which facilitate the calculations needed to plot the viscosity in poise versus the shear rate in reciprocal seconds ($s^{-1}$) was employed for these measurements. The same tackifier (Wingtack 95 ®) which is typical of the class of preferred tackifiers and at five (5) levels of loading was used with each block copolymer to produce adhesive compositions which were evaluated. The rate of shear chosen ($10^2$ to $10^4 s^{-1}$) covers the range normally encountered in melt extrusion processes. The rate of 5000 $s^{-1}$ at which the melt viscosities of the examples were compared was chosen because it very closely approximates the shear rates encountered in extrusion equipment being used in the adhesive coating industry today.

A study of FIGS. 1-4 reveals that adhesives prepared from Examples S-2 and S-8, typical adhesive compositions containing star block copolymers according to the present invention, can be extruded as easily as adhesives prepared from a linear ABA block copolymer (e.g., that sold under the trade designation Kratone ® 1107) and a 4 arm radial block copolymer (e.g., that sold under the trade designation Solprene ® 423). The difference, which might escape an unskilled observer, is key to the invention. That difference is the network integrity one may obtain from the star block copolymer through the crosslinking effect of the linking agent such as divinyl benzene "nucleus". It is this property which provides the superior internal strength which so admirably suits the PSAs of this invention to the critical requirements of a tape with high packaging and high shear holding power performance. FIGS. 1-4 are measurements of melt viscosities of the tackified block copolymers at shear rates encountered in industry and were designed to support the claimed invention.

These plots clearly show the superiority of the tackified star block copolymers of this invention over commercially available linear or four arm radial block copolymer adhesives at high tackifier levels.

Discussion of Physical Properties Relative to St. Clair U.S. Pat. No. 4,444,953

The present application defines and claims tackified star block copolymer pressure-sensitive adhesive compositions and sheet materials coated therewith. In parent application Ser. No. 507,684, it was disclosed that the star block copolymer required at least 6 arms. Subsequent to filing of that application, it was discovered that the disclosure in the parent application of the number of arms of the star block copolymer was incorrect because of a less accurate analytical method. Since then, a more accurate method of determining the number of arms, described in the R. C. Jordan et al article identified in footnote 2 of Table I, has been developed. According to the Jordan method, it was discovered that the polymers employed in the parent application, in fact, had more than twice as many arms as reported. The present continuation-in-part application reflects the correct analytical data, now specifying that the star polymer have an average of at least 12 arms.

As presently defined, the adhesive compositions described in the present application are thought to be clearly distinguishable over the comparison adhesive composition disclosed by St. Clair in U.S. Pat. No. 4,444,953.

Table VIII below compares certain physical properties of a conventional linear polymer and a conventional star polymer having an average of 8.6 arms, both being disclosed by St. Clair, with star block polymer according to the present invention.

TABLE VIII

| Tensile Properties | Conventional[1] Linear Polymer | Conventional[1] Star Polymer | Polymer Ex. S-8 |
|---|---|---|---|
| 300% (MPa) | 1.0 | 0.83 | 1.09 |
| 500% (MPa) | 1.2 | 1.3 | 1.66 |
| 700% (MPa) | 1.8 | 2.1 | 2.83 |
| Tensile @ break (MPa) | 22.8 | 18.6 | 27.9 |
| Elongation @ break (%) | 1340 | 1220 | 1200 |

[1]Data for conventional polymers from U.S. Pat. No. 4,444,953 determined according to ASTM D412 with a 250 mm/min crosshead speed.

It will be noted in Table VIII that the star polymer according to the present invention has a tensile strength at break that is about 50% greater than that of the conventional star polymer and much improved tensile modulus at elongations ranging from 300 to 700%.

Quite surprisingly, it was discovered that the Brookfield melt viscosity of adhesive compositions prepared with the star block polymer of the present invention is relatively low when compared with adhesive compositions prepared from conventional polymers such as the linear ABA block copolymer sold under the trade designation "Kraton" 1107 and conventional linear and star polymers as described by St. Clair in U.S. Pat. No. 4,444,953. Table IX shows the Brookfield melt viscosity of tackified adhesive compositions made with such polymers. As can be seen, the Brookfield viscosity of the conventional star polymer having an average of 8.6 arms described in St. Clair U.S. Pat. No. 4,444,953 is three times that of an adhesive composition containing star block polymer S-8 according to the present invention. This unexpected decrease in viscosity results in a much easier processability of pressure-sensitive adhesive compositions according to the present invention.

TABLE IX

| Polymer | Tackifier[1] level (phr) | Brookfield viscosity (Pa.s) | Shear @ 120 F. (minutes) |
|---|---|---|---|
| S-8 | 100 | 100[2] | 2840+ |
|  | 140 | 74[2] | 2840+ |
| "Kraton" 1107 | 100 | 61[2] | 1344 |
| Block Copolymer | 140 | — | 891 |
| Conventional linear | 130[3] | 65 (@ 350 F.)[4] | — |

TABLE IX-continued

| Polymer | Tackifier[1] level (phr) | Brookfield viscosity (Pa.s) | Shear @ 120 F. (minutes) |
|---|---|---|---|
| Conventional star | 130[3] | 300 (@ 350 F.)[4] | — |

[1]"Wingtack" 95
[2]viscosity values at 400 deg. F.
[3]includes 40 phr Wingtack 10
[4]data from U.S. Pat. No. 4,444,953

What is claimed is:

1. A coated sheet material comprising a backing member and a nornally tacky and pressure-sensitive adhesive composition covering at least a portion of one major surface thereof, said normally tacky and pressure-sensitive adhesive composition having a melt Brookfield viscosity in the range of about 25–100 Pa.s and comprising:
    (1) star block copolymer having the general formula (A-B)$_n$C wherein:
        "(A-B)" represents one of "n" polymeric arms, as measured by size exclusion chromatography with low-angle laser light-scattering detection, radiating from a nucleus represented by "C";
        "A" represents a terminal polymeric block consitting essentially of polymerized monovinyl aromatic monomer having 8 to 8 carbon atoms and being selected from a group consisting of styrene and alkylated styrene;
        "B" represents a polymeric block consisting essentially of a polymerized conjugated diene monomer having 4 to 12 carbon atoms;
        "C" represents the residue of a polyvinyl aromatic compound which provides a nucleus which links together at least 12 polymeric arms of said star block copolymer; and
        "n" is an interger of at least 12; and wherein:
        "A" comprises about 5–25 weight percent of the total weight of A plus B in said polymer;
        "B" comprises about 75 to 95 weight percent of the total weight of A plus B in said polymer; and
        "C" comprises no more than about 3 weight percent of the total weight of said star block copolymer; and
    (2) sufficient adhesive tackifier resin to maintain in said adhesive composition a balance of pressure-sensitive adhesive properties wherein the shear holding power is at least 1,000 minutes.

2. The coated sheet material of claim 1 wherein said adhesive tackifier resin is selected from a group consisting of polyterpene resin, polyvinyl aromatic resin, coumarone-indene, and mixed C$_5$ aliphatic and C$_9$ aromatic hydrocarbon resins.

3. The coated sheet material of claim 2 wherein said adhesive tackifier resin is mixed C$_5$ aliphatic and C$_9$ aromatic hydrocarbon resins.

4. The coated sheet material of claim 1 wherein said monovinyl aromatic monomer is selected from the group consisting of styrene and methyl styrene.

5. The coated sheet material of claim 4 wherein said monovinyl aromatic monomer is styrene.

6. The coated sheet material of claim 1 wherein said conjugated diene monomer is isoprene.

7. The coated sheet material of claim 1 wherein said backing member is flexible.

8. The coated sheet material of claim 7 wherein said backing member is a tape backing.

9. The coated sheet material of claim 8 wherein said backing member is coated entirely over one major surface with said adhesive composition and said adhesive coated backing is wound into a roll.

10. The coated sheet material of claim 1, wherein said backing member is a sheet formed by a material selected from the group consisting of paper, fabric, film-forming polymer, metal, rubber and ceramic.

11. The coated sheet material of claim 1, wherein said tackifier resin comprises 50 to 300 parts by weight per 100 parts of said star block copolymer.

12. A normally tacky and pressure sensitive adhesive composition having a melt Brookfield viscosity in the range of about 25–100 pa.s and comprising:
    (1) star block copolymer having the general formula (A-B)$_n$C wherein:
        "(A-B)" represents one of "n" polymeric arms, as measured by size exclusion chromatography with low-angle laswer light-scattering detection, radiating from a nucleus represented by "C";
        "A" represents a terminal polymeric block consisting essentially of polymerized monovinyl aromatic monomer having 8 to 18 carbon atoms and being selected from a group consisting of styrene and alkylated styrene;
        "B" represents a polymeric block consisting essentially of polymerized conjugated diene monomer having 4 to 12 carbon atoms;
        "C" represents the residue of a polyvinyl aromatic compound which provides a nucleus which links together at least 12 polymeric arms of said star block copolymer; and
        "n" is an integer of at least 12; and wherein:
        "A" comprises about 5–25 weight percent of the total weight percent of the total weight of A plus B in said polymer;
        "B" comprises about 75 to 95 weight percent of the total weight of A plus B in said polymer; and
        "C" comprises no more than about 3 weight percent of the total weight of said star block copolymer; and
    (2) sufficient adhesive tackifier resin to maintain in said adhesive composition a shear holding power of at least 1,000 minutes.

13. The normally tacky and pressure-sensitive adhesive composition of claim 12 wherein said adhesive tackifier resin is selected from a group consisting of polyterpene resin, polyvinyl aromatic resin, coumarone-indene, and mixed C$_5$ aliphatic and C$_9$ aromatic hydrocarbon resins.

14. The normally tacky and pressure sensitive adhesive composition of claim 13 wherein said adhesive tackifier resin is mixed C$_5$ aliphatic and C$_9$ aromatic hydrocarbon resins.

15. The normally tacky and pressure sensitive adhesive composition of claim 12 wherein said monovinyl aromatic monomer is selected from the group consisting of styrene and methyl styrene.

16. The normally tacky and pressure sensitive adhesive composition of claim 15 wherein said monovinyl aromatic monomer is styrene.

17. The normally tacky and pressure sensitive adhesive composition of claim 12 wherein said conjugated diene monomer is isoprene.

18. The normally tacky and pressure sensitive adhesive composition of claim 12 wherein said tackifier resin comprises 50 to 300 parts by weight per 100 parts of said star block copolymer.

* * * * *

UNITED STATES PATENT AND TRADEMARK OFFICE
CERTIFICATE OF CORRECTION

PATENT NO. : 4,780,367

DATED : October 25, 1988

INVENTOR(S) : Felix P. Lau and Spencer F. Silver

It is certified that error appears in the above-identified patent and that said Letters Patent is hereby corrected as shown below:

Col. 2, line 36, "copolYmers" should read --copolymers--.

Col. 3, line 21, "(A-B$_n$C" should read --(A-B$)_n$C--.

Col. 3, line 22, "(A-B" should read --(A-B)--.

Col. 4, line 20, "ws" should read --was--.

Col. 4, line 27, "digital" should read --Digital--.

Col. 4, line 64, "0.5" should read --5.0--.

Col. 4, line 65, "5.0" should read --0.5--.

Col. 8, line 11, "cntrolled" should read --controlled--.

Col. 13, line 12, "nornally" should read --normally--.

Col. 13, line 24, "consiting" should read --consisting--.

Col. 13, line 26, "8 to 8" should read --8 to 18--.

UNITED STATES PATENT AND TRADEMARK OFFICE
CERTIFICATE OF CORRECTION

PATENT NO. : 4,780,367

DATED : October 25, 1988

INVENTOR(S) : Felix P. Lau and Spencer F. Silver

It is certified that error appears in the above-identified patent and that said Letters Patent is hereby corrected as shown below:

Col. 13, line 26, "8 to 8" should read --8 to 18--.

Columns 7 & 8, Table 1, seventh item under the heading "sec-butyl lithium", "1.08" should read --0.26--.

Columns 7 & 8, Table 1, eighth item under the heading "sec-butyl lithium", "9.0" should read --1.08--.

Signed and Sealed this

Twenty-sixth Day of December, 1989

Attest:

JEFFREY M. SAMUELS

*Attesting Officer*   *Acting Commissioner of Patents and Trademarks*